Patented Jan. 14, 1941

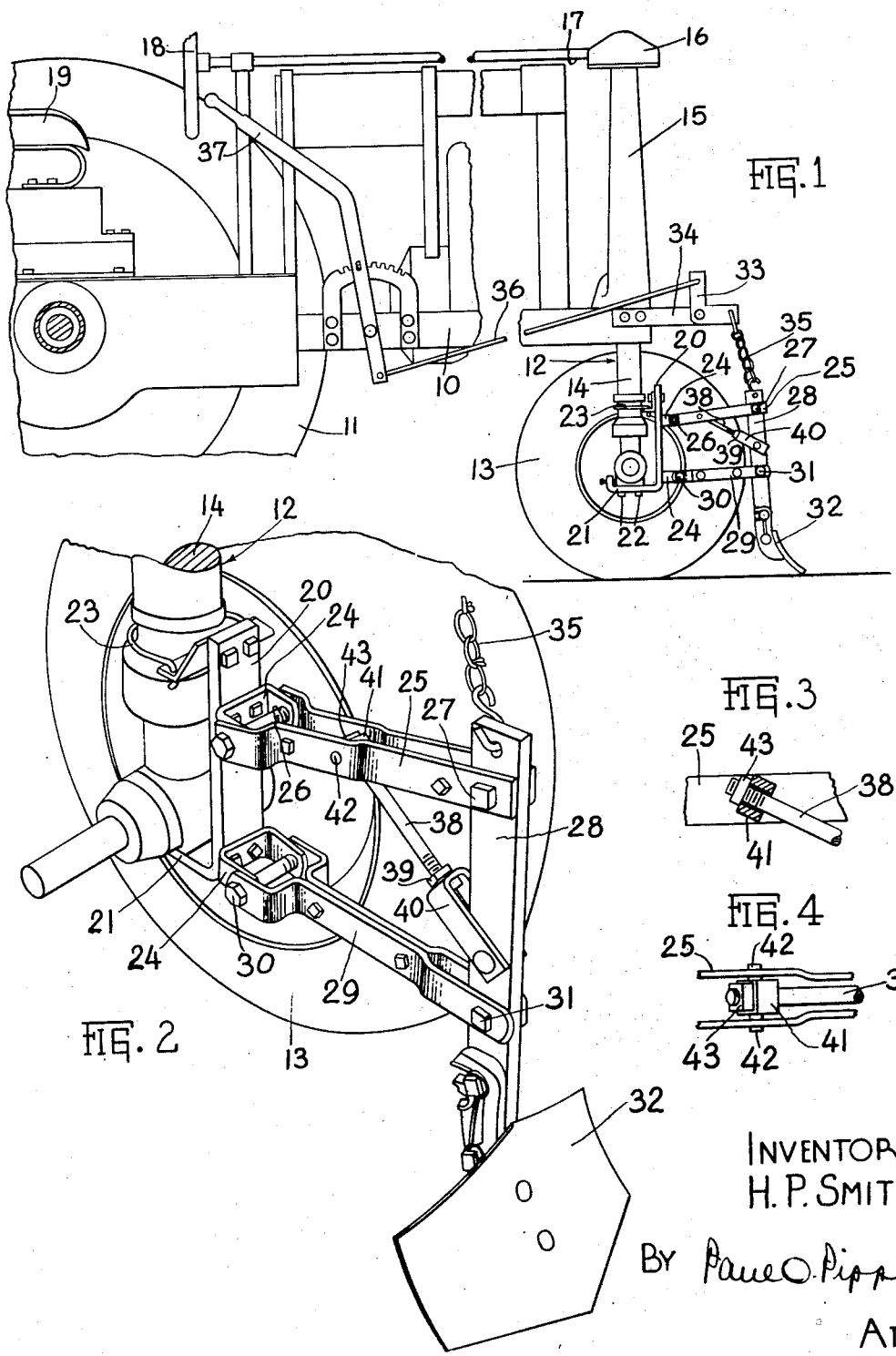

2,228,490

UNITED STATES PATENT OFFICE 2,228,490

TRACTOR ATTACHMENT

Hiram P. Smith, Canton, Ill., assignor to International Harvester Company, a corporation of New Jersey Application December 30, 1939, Serial No. 311,776

9 Claims. (Cl. 97—47)

This invention relates to a tractor attachment, and more particularly to improvements in tractor attachments of the type adapted to be disposed ahead of the front wheels of the tractor for breaking out ridges or lifting vines or for other similar purposes.

Devices of the type herein disclosed are generally used in connection with tractors of the tricycle type, the peculiarity of the association being due to the adaptability of the tractor of that type to carry agricultural implements of the row-crop type. The most common instance of the use of such tractor is that wherein the tractor has mounted thereon a row-crop cultivator. The field to be cultivated is formed with a series of ridges, and, when the tractor is operated along said ridges with the wheels riding on or between the ridges, little difficulty is experienced; but, when the tractor and cultivator are operated for cross-cultivating the field, the tractor must ride transversely across the ridges.

Similar difficulties are experienced when a tractor-mounted cultivator or the like is operated over fields in which are grown plants having vines apt to be damaged by the front wheel of the tractor. In both instances a device or attachment is mounted for vertical movement ahead of the wheel, the device having means for breaking out the ridges and lifting vines and means are provided within easy reach of the operator's station on the tractor by which the operator may raise and lower the device or attachment.

The chief difficulty experienced in prior constructions is the inability of the operator at the rear of the tractor to properly regulate the device at the front end of the tractor.

The principal object of the present invention is to provide means for establishing a definite position of the attachment independently of actuation of the lifting and lowering means.

An important object is to provide an attachment including parallel link members mounted for vertical movement on the tractor and having means yieldable to movement of the attachment in one direction and limiting movement in the other direction.

And, another object is to provide a simplified device that may be readily attached to the tractor.

Briefly and specifically, these and other important objects and features are achieved in one preferred form of the invention in connection with a tractor of the tricycle type which includes a front steerable truck having a vertical standard. The improved device comprises a pair of vertically spaced, parallel link members pivotally connected to the standard and pivotally carrying a leveler attachment for vertical movement from ground position to raised position. The link members and other parts form generally a parallelogram. The limiting means takes the form of a member connected across two sides of the parallelogram and is yieldable to permit flexing of the parallelogram in one direction and includes stop means for limiting flexing in the other direction. A more complete understanding of the invention as embodied in a preferred construction may be had from the following detailed description taken in conjunction with the accompanying sheet of drawings, in which:

Figure 1 is a side elevational view, showing the attachment in position on a tractor;

Figure 2 is an enlarged, perspective view of the arrangement between the attachment and the tractor front end structure; and, Figures 3 and 4 are views illustrating the slidable connection between the limiting member and a parallel link member.

The vehicle chosen for the purposes of illustration is a tractor of the tricycle type including a narrow longitudinal body 10 carried at its rear on a pair of widely spaced drive wheels 11, only one of which is shown, and at its front end on a steerable front truck assembly 12 including a pair of closely spaced wheels 13, only one of which is shown. The front truck assembly includes a vertical standard 14 which extends upwardly at the front of the tractor in a vertical housing 15. The housing 15 carries at its upper end, in a housing portion 16, suitable gearing, not shown, by which the standard 14 is connected to a longitudinally rearwardly extending steering rod 17. The steering rod 17 carries at its rearward end a steering wheel 18 located just forwardly of an operator's station 19 carried on the tractor body.

The standard 14 carries a vertical member 20 having a horizontal lower portion 21 secured to a bottom portion of the standard by bolts 22. The upper portion of the member 20 is preferably connected by a wire loop member 23 to a portion of the standard above the axis of the wheels 13. The member 20 includes at vertically spaced points thereon forwardly extending pivot brackets 24. An upper link member 25, comprising a pair of spaced bars, is pivotally attached at its rear end by a pivot pin 26 to the upper bracket 24 and extends forwardly thereof where it is pivotally connected, as at 27, to a vertical supporting member 28. A lower link member 29, comprising a pair of spaced bars, is pivotally connected to the lower bracket 24 on a pin 30 and extends forwardly thereof, generally parallel to the link member 25, and is pivotally connected at its forward end at 31 to the vertical supporting member 28. The vertical members 20 and 28 and the parallel link members 25 and 29 form a parallelogram. The structure thus provided is mounted for vertical movement forwardly of the standard 14. The member 28 carries at its lower end a suitable implement member 32, which in the present instance is illustrated as being a leveler blade.

The attachment structure thus provided is adapted to be lifted and lowered by an operator on the seat 19. The lifting and lowering means includes a bell crank 33 pivotally carried on a horizontal axis on a bracket 34 at the front end of the tractor. One arm of the bell crank is flexibly connected by a chain 35 to the upper end of the implement-carrying member 28. The other arm of the crank is suitably attached to a rearwardly extending link 36, which is in turn operatively connected to a hand lever 37 pivotally carried on the tractor and having a handle portion arranged in close proximity to the operator's station 19. It will be readily apparent that the lifting and lowering means provided is capable of lifting and lowering the implement attachment at the forward end of the tractor.

As mentioned above, considerable difficulty is experienced by the operator in ascertaining from his position on the tractor the correct height at which the attachment must be operated. The operator is consequently faced with the problem of selecting the position of the attachment solely by means of the hand lever 37. The present invention contemplates the provision of means for eliminating this difficulty. This means takes the form in the present instance of a rod 38 having its lower end adjustably connected, as at 39, to a U-shaped member 40, pivotally connected to the implement carrying member 28 above the pivot pin 31. As best shown in Figure 3, the upper end of the rod passes slidably through a collar 41 having opposite trunnions 42 pivoted in the spaced bars of the upper link member 25 (Figure 4). The upper end of the rod is provided with a stop member in the form of a nut 43 threaded thereon.

As previously mentioned, the attachment structure forms generally a parallelogram. The rod 38 and member 40 provide means cross-connecting two sides of this parallelogram. In the present instance, the rod 38 is arranged generally as, or parallel to, a diagonal of this parallelogram. It will be understood, of course, that any means cross-connecting two sides of the parallelogram and arranged non-parallel to any one side will serve the purpose for which the rod 38 is provided. In short, the object is to provide a triangular structure preventing flexing of the parallelogram.

In the present instance, however, flexing of the parallelogram is prevented in only one direction. The rod 38, because of its slidable and pivotal connection with the upper link member 25, is yieldable to flexing of the parallelogram structure upwardly from the ground. This structure provides for adjustably limiting downward movement of the leveler attachment. Adjustment of the means 39 provides for varying the extent of downward flexing of the parallelogram structure. The slidable connection permits the attachment to be raised in the usual manner by the hand lever 37. It will thus be seen that the operator may release the hand lever 37 without particular selection of position; that is to say, he may move the lever 37 rearwardly to any extent without the necessity of ascertaining to what position the leveler attachment will fall. This position is regulated by the rod 38 and can be chosen beforehand, according to the conditions surrounding the instant operation of the tractor.

From the foregoing description it will be seen that an improved implement attachment has been provided for use with a tractor for the purposes set forth. It will be understood, of course, that only a preferred embodiment of the invention has been illustrated, and that numerous modifications and alterations may be made therein not inconsistent with the spirit and scope of the invention as defined in the appended claims.

What is claimed is:

1. An attachment for a tractor in which the tractor includes a front wheel having a vertical standard, comprising a pair of vertically spaced, forwardly extending, parallel link members pivotally carried on the standard for vertical movement, an implement member pivotally connected to the link members forwardly of the wheel for vertical movement with the link members, lifting and lowering means for said implement members, and adjustable means for limiting vertical movement of said members.

2. An attachment for a tractor in which the tractor includes a front wheel having a vertical standard, comprising vertically spaced, forwardly extending, parallel link members pivoted on the standard, an implement including a vertical member pivotally carried by said links for vertical movement therewith, said link members and the standard and the implement-carrying member forming generally a parallelogram, lifting and lowering means connected to one of said members, and adjustable means for said members including an adjustable member arranged between two of said members generally as a diagonal of said parallelogram.

3. An attachment for a tractor in which the tractor includes a front wheel having a vertical standard, comprising a parallel link structure mounted on the standard for vertical movement, an implement carried by said structure, means connected to said structure for lifting and lowering said implement, and means associated with said structure independently of the lifting and lowering means for limiting downward movement of said structure.

4. An attachment for a tractor including a front wheel having a vertical standard, comprising a pair of forwardly extending parallel link members pivotally connected to the standard and mounted for vertical movement, a substantially vertical member pivotally connected to said link members and carrying an implement forwardly of the wheel, and a non-parallel member connecting two of the aforesaid members for limiting downward movement thereof.

5. An attachment for a vehicle including a front wheel and a substantially vertically disposed forward member, comprising a pair of vertically spaced parallel link members pivotally connected to the forward member for vertical movement, a vertical member pivotally connected to said link members for vertical movement therewith and carrying an implement, and means cross-connecting two of the aforesaid members for limiting vertical movement thereof in one direction.

6. An attachment for a tractor having a front wheel, comprising four pivotally connected link members forming a parallel link structure, one of said members being securable to the tractor, said structure having vertical movement with respect to the tractor, an implement member carried by another link member and movable vertically with said structure, and an adjustable means cross-connecting two of said link members for limiting vertical movement of said structure in one direction.

7. An attachment for a tractor, comprising a pair of vertically spaced, generally parallel members pivoted on the tractor for vertical movement, an upstanding member pivotally carried on said parallel members for vertical movement therewith and including an implement, and means for limiting vertical movement of said members in one direction comprising an element connected between two of said members and yieldable to vertical movement of said members in only one direction.

8. An attachment for a tractor, comprising a pair of vertically spaced, generally parallel members pivoted on the tractor for vertical movement, an upstanding member pivotally carried on said parallel members for vertical movement therewith and including an implement, and means for limiting vertical movement of said members in one direction comprising an element pivotally connected to one member and slidably connected to another member and including a stop for limiting slidable movement in one direction.

9. A parallel link structure for a tractor-mounted implement, comprising a member adapted to be mounted on a tractor, a pair of parallel link members pivotally carried by said member, an implement-carrying member pivotally connected to said link members, the link members and the implement-carrying member being movable in two directions in a plane with respect to the attaching member, and means for limiting movement of said members comprising an element connecting two of said members and yieldable to movement of said members in only one direction and limiting movement in the other direction.

HIRAM P. SMITH.